United States Patent [19]

Opprecht

[11] 4,332,994
[45] Jun. 1, 1982

[54] APPARATUS FOR RESISTANCE WELDING OF CAN BODIES

[76] Inventor: Paul Opprecht, Im hinteren Bernold, 8962 Bergdietikon, Switzerland

[21] Appl. No.: 122,038

[22] Filed: Feb. 19, 1980

Related U.S. Application Data

[63] Continuation-in-part of Ser. No. 919,049, Jun. 26, 1978, abandoned.

[30] Foreign Application Priority Data

Jan. 25, 1978 [CH] Switzerland .............................. 767/78

[51] Int. Cl.³ ........................ B23K 11/30; B23K 11/32
[52] U.S. Cl. ............................................ 219/64; 219/81
[58] Field of Search ............ 219/64, 69 V, 81, 125.12; 228/45

[56] References Cited

U.S. PATENT DOCUMENTS

| 2,204,549 | 6/1940 | Murch | 219/64 X |
|---|---|---|---|
| 2,294,418 | 9/1942 | Murch | 219/64 |
| 2,444,463 | 7/1948 | Nordquist | 219/64 |
| 3,264,445 | 8/1966 | Arnoldy | 219/125.12 X |
| 3,591,756 | 7/1971 | Timko | 219/64 X |
| 3,834,010 | 9/1974 | Wolfe et al. | 219/64 X |

FOREIGN PATENT DOCUMENTS

| 1022719 | 1/1958 | Fed. Rep. of Germany | 219/81 |
|---|---|---|---|
| 429982 | 8/1967 | Switzerland | 219/64 |
| 308837 | 9/1971 | U.S.S.R. | |
| 327746 | 7/1976 | U.S.S.R. | 219/81 |
| 599939 | 3/1978 | U.S.S.R. | |

Primary Examiner—J. V. Truhe
Assistant Examiner—Keith E. George
Attorney, Agent, or Firm—Werner W. Kleeman

[57] ABSTRACT

An apparatus for resistance welding of the longitudinal seam of can bodies by means of electrode rollers which are suspended so as to be oscillatingly drivable transversely with respect to the edges of the can bodies which are to be welded, in order to prevent premature wear of the electrode rollers due to the formation of notches, scoring or the like. The lower electrode roller which is additionally oscillatingly or reciprocatingly suspended in vertical direction provides outstanding accessibility and low dead mass of the moved parts.

10 Claims, 2 Drawing Figures

APPARATUS FOR RESISTANCE WELDING OF CAN BODIES

CROSS-REFERENCE TO RELATED CASE

This application is a continuation-in-part application of my commonly assigned U.S. application Ser. No. 919,049, filed June 26, 1978, now abandoned.

BACKGROUND OF THE INVENTION

The present invention relates to a new and improved construction of apparatus for resistance welding the seams of can bodies or the like by means of electrode rolls or rollers.

During the welding of can bodies, typically formed of tin plate or sheet metal, in resistance welding machines which weld the seam of such can bodies by means of electrode rolls or rollers and normally employ centering and clamping devices in order to ensure for the complete parallelism of the edges of the can bodies in the Z-rail serving as guide means, there exists the disadvantage that the squeezing together of the overlap seam produces a relatively intensive wear of the welding roll due to the formation of notches or grooves thereat. Therefore there is frequently required a post-machining of the bronze material of the electrode rolls, in order to ensure for the requisite quality of the overlap welding seam. This post-machining work is associated with extremely high material losses.

In order to reduce this post-machining work, there has been proposed according to Swiss Pat. No. 429,982 shifting of the sheet metal guide means, i.e. the Z-rail transversely with respect to the lengthwise axis thereof. Due to these measures there are shifted the contact locations of the overlapping edges of the can body at the electrode rollers, whereby there can be prevented the formation of grooves or notches.

In welding machines where the Z-rail simultaneously assumes the function of the supporting structure for the upper electrode roller, it is not possible to use the previously described apparatus.

Furthermore, it is known from the aforementioned Swiss Pat. No. 429,982 to periodically somewhat axially displace the electrode rollers or rolls by means of handwheels mounted at the shafts or axles of the electrode rollers.

This displacement mechanism is only suitable for use with slowly operating welding machines having low production rates.

SUMMARY OF THE INVENTION

Hence, with the foregoing in mind, it is a primary object of the present invention to provide a new and improved construction of resistance welding apparatus for can bodies and the like which is not associated with the aforementioned drawbacks and limitations of the prior art constructions.

Another and more specific object of the present invention aims at providing a new and improved construction of apparatus for the welding of the longitudinal seam of can bodies which is equipped with a suitable electrode roller-adjustment mechanism which appropriately also does not inhibit the accessibility of the electrode rollers and is of simple construction.

Yet a further significant object of the present invention aims at providing a new and improved construction of roll-resistance welding apparatus which is relatively simple in construction and design, economical to manufacture, extremely reliable in operation, not readily subject to breakdown or malfunction, and requires a minimum of maintenance and servicing.

Still a further significant object of the present invention is directed to devising a novel construction of roll-resistance welding machine having adjustment means for the electrode rollers so as to minimize the undesirable scoring or notching of the rollers.

Now in order implement these and still further objects of the invention, which will become more readily apparent as the description proceeds, the apparatus of the present development for the resistance welding of the longitudinal seam of can bodies by means of electrode rollers or rolls, will be seen to comprise guide means, typically in the form of a Z-rail, for guiding and overlapping the edges of the can bodies. According to significant aspects of the invention the lower electrode roller together with its drive shaft is oscillatingly or reciprocatingly suspended for vertical movement, and the lower electrode roller and the upper electrode roller are additionally oscillatingly movable transversely with respect to the edges of the can bodies.

Due to the combination of a pendulum-type or reciprocatable suspension of the lower electrode roller, which already affords appreciable advantages during seam welding in contrast to a rigid mounting or suspension, there is now afforded the additional advantage of axial displacement or shifting of the entire pendulum-type suspension.

By virtue of the arrangement of the center of gravity of the upper electrode roller essentially at the center of the can body, there is produced a uniform contact of the electrode roll at the can body and which electrode roll has a convex outer surface. The curvature approximately corresponds to the curvature of the rolled can body.

Furthermore, it is advantageous to fixedly arrange the upper electrode roller in a pivotable yoke, so that the energy supply can be accomplished to the yoke and/or the stationary shaft by means of an elastic element. It also has been found to be extremely advantageous to move the yoke or equivalent structure by means of an eccentric drive. By virtue of these measures there is dispensed with the use of complicated sliding contacts for the electrode roller.

Due to the reciprocating or oscillating suspension of the lower electrode roller and the energy supply thereof by means of energy in the support or bearing housing externally of the electrode roller, there is realized an exceptional accessibility at the welding zone. At the same time there is also reduced the dead mass of the electrode roller.

Just as was the case for the upper electrode roller it has been found to be advantageous to move the lower electrode roller as a unit together with its shaft and the energy transmitting support or bearing means, transversely with respect to the edges of the can body.

It has been found to be advantageous to synchronize the transverse movements of the upper and lower electrode rollers.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
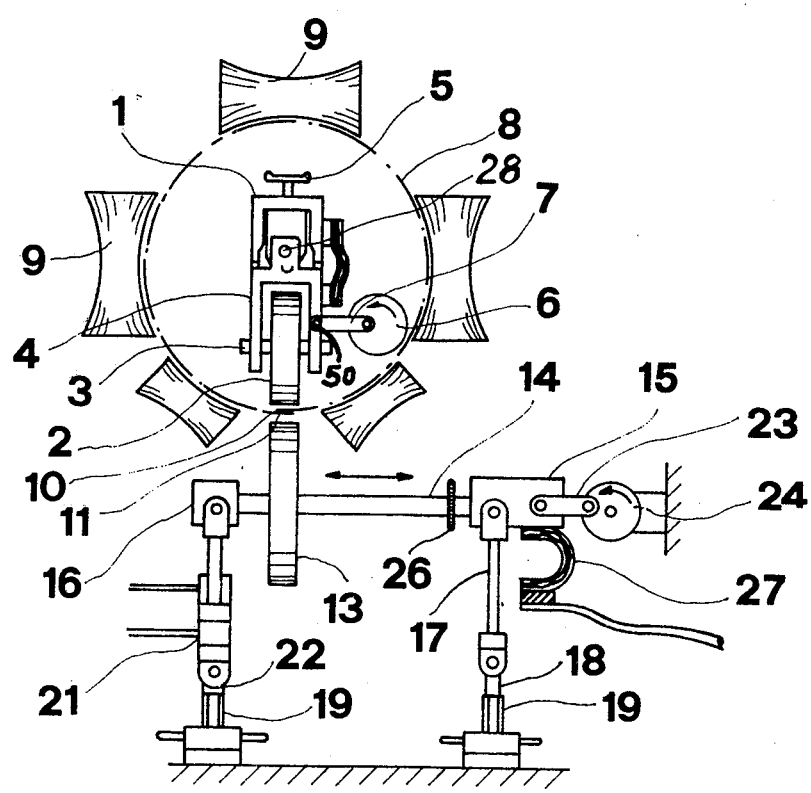
FIG. 1 is a schematic front view of the electrode rollers of a resistance welding machine or apparatus having a pendulum-type suspension system.

Describing now the drawings, it is to be understood that only enough of the electrode roller-resistance welding machine or apparatus has been shown in order to enable those skilled in the art to readily understand the underlying principles and concepts of the present invention. Turning attention now to the drawings, it will be seen that the upper electrode roller or roll 2 of a pair of resistance electrode rollers 2 and 13 is mounted at the free end 1a of a support or carrier arm 1 which is rigidly connected with the not particularly illustrated frame of a resistance welding machine. In order to be able to compensate for wear of the electrode roller 2 the roller shaft 3 is mounted in a roller support shown in the form of a yoke 4 which is vertically displaceable at the support arm 1 and pivotable about a pivot shaft or pivot point 28. An adjustment device in the form of an adjustment screw 5 serves as the adjustment element for vertical displacement or shifting of this electrode roller or roll 2. The electrode roll 2 together with the yoke 4 is pivotable in axial direction by means of an eccentric shaft 6 having a connecting rod 7 which is connected at location 50 with the yoke 4. The eccentric shaft 6 or equivalent element together with the connecting rod 7 form an eccentric drive for pivoting the yoke 4.

As best seen by referring to FIG. 1, a can body 8 shown in phantom lines and formed of sheet metal or tin plate by way of example, completely encloses the support or carrier arm 1 and is exactly guided at the outer surface thereof by a number of so-called hourglass or calibrating rolls 9.

Figure 2:
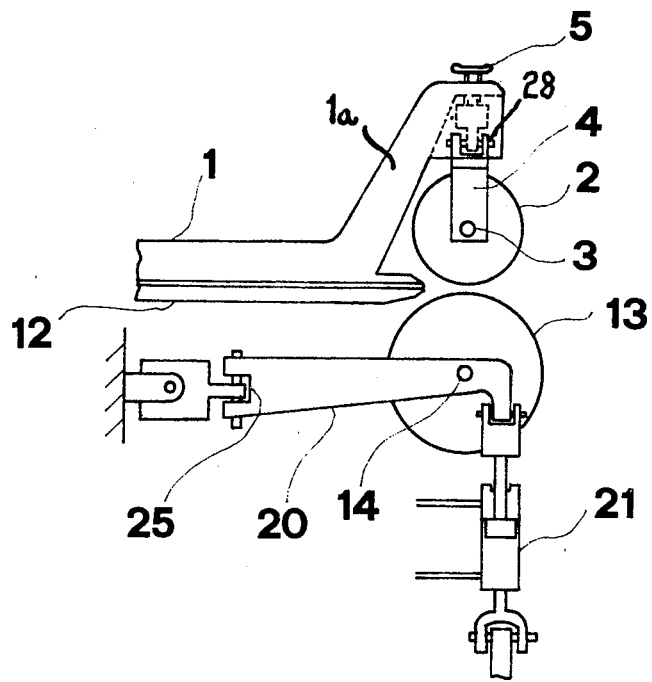
FIG. 2 is a side view of the electrode rollers or rolls of the arrangement of FIG. 1 with the pendulum-type or oscillating suspension system.

Now to ensure on the one hand for an exactly defined overlapping of the edges 10 and 11 of the can body 8, and, on the other hand, to obtain an exact guiding of such can body edges 10 and 11, there is mounted at the support arm 1 a so-called Z-rail 12 defining can body guide means, as best seen by referring to FIG. 2. The Z-rail 12 also can simultaneously assume the function of the support or carrier arm 1.

The second electrode roll 13 is suspended vertically in an oscillating or reciprocating, i.e. pendulum-like fashion. The shaft 14 which is fixedly or rigidly connected with the electrode roller 13 defining the lower electrode roller rotates in the bearing or support housings 15 and 16. The housing 15, apart from containing the standard bearings for the shaft 14, also contains a suitable energy transmission device, for instance mercury contacts, by means of which the energy which is infed through the agency of the rather massive current conductor 27 is transmitted from the stationary bearing means with as little loss as possible to the rotating shaft 14. The housing 15 is pivotably connected by means of a rod 17 with a socket or base element 18. This socket 18 is elevationally displaceable by means of a threaded rod 19. On the one hand, the housing 16 is pivotably articulated or hingedly connected with a pendulum or oscillating arm 20, and, on the other hand, is hingedly connected in the pivot plane of the rod 17 by means of a fluid operated i.e. hydraulic or pneumatic piston and cylinder unit 21 with a fixed socket or base 22 which is elevationally displaceable by means of threaded rod 19. The piston and cylinder unit 21 and the rod 17 together with the shaft 14 form a so-called four-bar linkage mechansim or simply a linkage means. A crank 23 or equivalent structure engages at the housing 15. This crank 23 is driven by an eccentric shaft 24 and imparts to the shaft 14 together with the lower electrode roller 13 an axial to-and-fro movement through a few millimeters.

Now this movement is taken-up by a hinge or a pivot means 25, defining two axes located at right angles to one another, at the pendulum or oscillating arm 20. The axial deflections which are produced by the slightly arcuate-shaped movement curves are taken-up in the support or bearing housings 15 and 16 by conventional spherical roller bearings.

The drive of the electrode roller 13 and the shaft 14 can be accomplished by means of a sprocket wheel or gear 26. Of course, it is also conceivable to mount the sprocket wheel 26 externally of the support or bearing housing 15. The axial movement of the sprocket wheel 26 together with the shaft 14 is readily taken-up by the flexibility of the coacting sprocket chain. By means of the pressurized medium operated piston and cylinder unit 21 it is possible to raise the electrode roller 13 from the electrode roller 2 or to press such electrode roller 13 towards the electrode roller 2. The pneumatic piston and cylinder unit 21 serves to reciprocatingly suspend the lower electrode roller 13 for reciprocating movement in the direction of the upper electrode roller 2 during the welding operation. The lower electrode roller 13 is therefore able to reciprocate, i.e. move up and down, when encountering possible irregular can body thicknesses.

Having now had the benefit of the foregoing description of the inventive resistance welding machine, its mode of operation will be considered and is as follows:

During such time as the welding machine is in operation, that is during or after each pass, that is to say, depending upon the spacing of the can bodies from one another, then during or after each welding of a can body or blank 8 the eccentric shafts 6 and 24 rotate, preferably in synchronism, by a small amount and thus displace the electrode rollers 2 and 13 in relation to the Z-rail. With small values of the angular rotation at the eccentric shafts 6 and 24 there can be achieved the result that due to a complete uniform wear of the electrode rollers or rolls 2 and 13 there no longer occurs any disturbing scoring or notch formation which impairs the quality of the weld.

If after a longer service time there is required a machining or turning of the surface of the electrode rollers and as a consequence thereof the roller diameter becomes smaller, then the electrode rollers can be easily positionally readjusted by means of the adjustment screw 5 and the threaded rod 19. It is not necessary to positionally readjust the hourglass rollers or rolls 9.

While there are shown and described present preferred embodiments of the invention, it is to be distinctly understood that the invention is not limited thereto, but may be otherwise variously embodied and practised within the scope of the following claims. Accordingly,

What I claim is:

1. An apparatus for the resistance welding of the longitudinal seam of can bodies by means of electrode rollers, comprising:

guide means for guiding and overlapping the edges of the can bodies to be welded;

a pair of electrode rollers comprising an upper electrode roller and a lower electrode roller;

said lower electrode roller having a drive shaft;

means for suspending said lower electrode roller together with its drive shaft for movement during the welding operation towards and away from said upper electrode roller in response to variations in the thickness of the can body to be welded;

said suspending means simultaneously also serving to normally bias the lower electrode roller toward the upper electrode roller in order to maintain a substantially constant welding pressure during the welding operation;

means for mounting said lower and upper electrode rollers for movement transversely with respect to the edges to be welded of the can bodies and in the axial direction of said lower and upper electrode rollers; and said mounting means for said lower and upper electrode rollers enabling transverse movement with respect to the edges to be welded of the can bodies and in the axial direction of the lower and upper electrode rollers during welding of the can bodies.

2. The apparatus as defined in claim 1, wherein:
said means for mounting said upper electrode roller comprises a pivotable yoke in which there is fixedly mounted said upper electrode roller.

3. The apparatus as defined in claim 2, wherein:
said mounting means comprises pivot means for pivotably mounting said yoke about a pivot point located essentially at the center of the can body.

4. The apparatus as defined in claim 3, further including:
eccentric drive means for pivoting said yoke.

5. The apparatus as defined in claim 1, wherein:
said mounting means for said lower electrode roller comprises linkage means for enabling movement of said lower electrode roller transversely with respect to the edges of the can body.

6. The apparatus as defined in claim 5, further including:
eccentric drive means for controlling the transverse movement of said lower electrode roller and its drive shaft.

7. The apparatus as defined in claim 6, wherein:
said means for mounting said upper electrode roller comprises a pivotable yoke at which there is fixedly mounted said upper electrode roller;
eccentric drive means for pivoting said yoke; and
said eccentric drive means for pivoting said yoke and said eccentric drive means for controlling the transverse movement of the lower electrode roller operating in synchronism with respect to one another.

8. The apparatus as defined in claim 6, wherein:
said means for mounting said upper electrode roller comprises a pivotable yoke at which there is fixedly mounted said upper electrode roller;
eccentric drive means for pivoting said yoke; and
said eccentric drive means of each related electrode roller pivoting each such related electrode roller through a small angular value following welding of a can body.

9. The apparatus as defined in claim 1, wherein:
said suspending means includes fluid-operated means for displacing the lower electrode roller towards the upper electrode roller.

10. The apparatus as defined in claim 9, wherein:
said fluid-operated means comprise piston and cylinder means activatable by a pressurized fluid medium.

* * * * *